US012117830B2

(12) United States Patent
Peebles et al.

(10) Patent No.: US 12,117,830 B2
(45) Date of Patent: *Oct. 15, 2024

(54) MACHINE TO MACHINE TARGETING MAINTAINING POSITIVE IDENTIFICATION

(71) Applicant: AEROVIRONMENT, INC., Arlington, VA (US)

(72) Inventors: Macdonald John Peebles, Chatsworth, CA (US); Andrew Martin, Encino, CA (US); Charles Lawrence Baker, Moorpark, CA (US); Daisy Wang, Simi Valley, CA (US); Kevin Jay Aguilar, Simi Valley, CA (US); Matthew Allen Hanna, Montrose, CA (US); Brian Young, Simi Valley, CA (US); Eric Sornborger, Los Angeles, CA (US); Eric James Aagaard, Los Angeles, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,987

(22) Filed: Jun. 13, 2023

(65) Prior Publication Data

US 2024/0152137 A1 May 9, 2024

Related U.S. Application Data

(63) Continuation of application No. 17/395,102, filed on Aug. 5, 2021, now Pat. No. 11,714,407, which is a
(Continued)

(51) Int. Cl.
*G05D 1/00* (2024.01)
*B64C 39/02* (2023.01)
(Continued)

(52) U.S. Cl.
CPC ......... *G05D 1/0027* (2013.01); *B64C 39/024* (2013.01); *B64D 1/04* (2013.01);
(Continued)

(58) Field of Classification Search
CPC .................................................. G05D 1/0027
See application file for complete search history.

(56) References Cited

U.S. PATENT DOCUMENTS

| 5,458,041 A | 10/1995 | Sun et al. |
| 2010/0017046 A1 | 1/2010 | Cheung et al. |

(Continued)

FOREIGN PATENT DOCUMENTS

| JP | 2002519619 A | 7/2002 |
| WO | 2013163746 A1 | 11/2013 |

OTHER PUBLICATIONS

International Search Report for serial No. PCT/US16/24088 mailed Jul. 18, 2016.

*Primary Examiner* — Anshul Sood
(74) *Attorney, Agent, or Firm* — Concept IP LLP; Michael Zarrabian; Eric Aagaard

(57) ABSTRACT

A method of targeting, which involves capturing a first video of a scene about a potential targeting coordinate by a first video sensor on a first aircraft; transmitting the first video and associated potential targeting coordinate by the first aircraft; receiving the first video on a first display in communication with a processor, the processor also receiving the potential targeting coordinate; selecting the potential targeting coordinate to be an actual targeting coordinate for a second aircraft in response to viewing the first video on the first display; and guiding a second aircraft toward the actual targeting coordinate; where positive identification of a target corresponding to the actual targeting coordinate is maintained from selection of the actual targeting coordinate.

20 Claims, 13 Drawing Sheets

Related U.S. Application Data continuation of application No. 15/080,389, filed on Mar. 24, 2016, now Pat. No. 11,112,787.

(60) Provisional application No. 62/138,305, filed on Mar. 25, 2015.

(51) Int. Cl.

| | | |
|---|---|---|
| *B64D 1/04* | (2006.01) | |
| *B64D 1/16* | (2006.01) | |
| *B64D 47/08* | (2006.01) | |
| *F41G 3/02* | (2006.01) | |
| *F41G 3/04* | (2006.01) | |
| *F41G 3/14* | (2006.01) | |
| *F41G 3/16* | (2006.01) | |
| *F41G 7/00* | (2006.01) | |
| *F41G 7/20* | (2006.01) | |
| *F41G 7/22* | (2006.01) | |
| *F41G 9/00* | (2006.01) | |
| *G01C 11/06* | (2006.01) | |
| *G01C 23/00* | (2006.01) | |
| *G08G 5/00* | (2006.01) | |

(52) U.S. Cl.
CPC ............... *B64D 1/16* (2013.01); *B64D 47/08* (2013.01); *F41G 3/02* (2013.01); *F41G 3/04* (2013.01); *F41G 3/145* (2013.01); *F41G 3/165* (2013.01); *F41G 7/007* (2013.01); *F41G 7/20* (2013.01); *F41G 7/2233* (2013.01); *F41G 9/00* (2013.01); *G01C 11/06* (2013.01); *G01C 23/00* (2013.01); *G08G 5/0047* (2013.01); *G08G 5/0013* (2013.01); *G08G 5/0026* (2013.01); *G08G 5/0034* (2013.01); *G08G 5/0069* (2013.01)

(56) References Cited

U.S. PATENT DOCUMENTS

| | | |
|---|---|---|
| 2010/0157056 A1 | 6/2010 | Zohar et al. |
| 2012/0210853 A1 | 8/2012 | Abershitz et al. |
| 2015/0142211 A1 | 5/2015 | Shehata et al. |

MACHINE TO MACHINE TARGETING MAINTAINING POSITIVE IDENTIFICATION

CROSS-REFERENCE TO RELATED APPLICATIONS

This application is a continuation of U.S. Non-Provisional patent application Ser. No. 17/395,102, filed Aug. 5, 2021, which is a continuation of U.S. Non-Provisional patent application Ser. No. 15/080,389, filed Mar. 24, 2016, which issued as U.S. Pat. No. 11,112,787 on Sep. 7, 2021, which claims priority to and the benefit of U.S. Provisional Patent Application No. 62/138,305, filed Mar. 25, 2015, the contents of all of which are hereby incorporated by reference herein for all purposes.

TECHNICAL FIELD

The invention relates to Unmanned Aerial Systems (UAS), and more particularly to UAS identification of targets.

BACKGROUND

Unmanned Aerial Systems (UAS) include Unmanned Aerial Vehicles (UAV) that may be remotely controlled by one or more operators at one or more Ground Control Systems (GCS). Restrictive rules of engagement may require that a positive identification (PID) of a target be maintained from identification to final contact.

SUMMARY

Some embodiments of the present invention may include a targeting method which may include: capturing a first video of a scene about a potential targeting coordinate by a first video sensor on a first aircraft; transmitting the first video and associated potential targeting coordinate by the first aircraft; receiving the first video on a first display in communication with a processor, the processor also receiving the potential targeting coordinate; selecting the potential targeting coordinate to be an actual targeting coordinate for a second aircraft in response to viewing the first video on the first display; and guiding a second aircraft toward the actual targeting coordinate; where positive identification of a target corresponding to the actual targeting coordinate is maintained from selection of the actual targeting coordinate. Additional exemplary method embodiments may include launching the second aircraft having a second video sensor.

Additional exemplary method embodiments may include orbiting the first aircraft about the actual targeting coordinate to maintain a field of view (FOV) of the first video sensor about the actual targeting coordinate. Additional exemplary method embodiments may include capturing a second video of the scene by the second video sensor, and receiving the second video on the first display as the second aircraft approaches the actual targeting coordinate. In additional exemplary method embodiments, maintaining positive identification of the target may further include comparing, by a user of the processor, the received first video of the scene and the received second video of the scene on the first display to confirm the second aircraft is approaching the actual targeting coordinate. Additional exemplary method embodiments may include selecting a terminal homing mode on the target by the second aircraft in response to viewing the first video and the second video on the first display. In additional exemplary method embodiments the terminal homing mode may further include at least one of: impacting the target by the second aircraft, impacting the target by a payload deployed by the second aircraft, and impacting the target by a marker deployed by the second aircraft. Additional exemplary method embodiments may include confirming a condition of the target after impact in response to viewing the first video on the first display.

Additional exemplary method embodiments may include capturing the first video of a new scene about a new potential targeting coordinate by the first video sensor on the first aircraft; transmitting the first video and associated new potential targeting coordinate by the first aircraft; receiving the first video on the first display in communication with the processor, the processor also receiving the new potential targeting coordinate; selecting the new potential targeting coordinate to be a new actual targeting coordinate for a third aircraft in response to viewing the first video on the first display; and guiding the third aircraft toward the new actual targeting coordinate; where positive identification of a new target corresponding to the new actual targeting coordinate is maintained from selection of the new actual targeting coordinate. In additional exemplary method embodiments the selected potential targeting coordinate may be a geographical coordinate corresponding to a center field of view (CFOV) of the captured first video and/or a geographical coordinate corresponding to a pixel in the field of view (FOV) of the captured first video.

Another exemplary method embodiment may include: receiving, by a ground control system (GCS), a first video stream from a first aircraft and a potential targeting coordinate related to the first video stream; selecting, by the GCS, the potential targeting coordinate corresponding to a target as an actual targeting coordinate; receiving, by the GCS, a second video stream from a second aircraft; and guiding, by the GCS, the second aircraft towards the actual targeting coordinate; where positive identification of the target is maintained by the GCS from selection of the actual targeting coordinate.

Additional exemplary method embodiments may include selecting, by the GCS, a terminal homing mode on the target by the second aircraft. In additional exemplary method embodiments, the terminal homing mode may include at least one of: impacting the target by the second aircraft, impacting the target by a payload deployed by the second aircraft, and impacting the target by a marker deployed by the second aircraft. Additional exemplary method embodiments may include confirming, via the GCS, a condition of the target after impact via the received first video stream from the first aircraft. Additional exemplary method embodiments may include selecting, by the GCS, a new potential targeting coordinate corresponding to a new target as a new actual targeting coordinate; receiving, by the GCS, a third video stream from a third aircraft; and guiding, by the GCS, the third aircraft towards the new actual targeting coordinate. In additional exemplary method embodiments, the selected potential targeting coordinate is a geographical coordinate corresponding to a center field of view (CFOV) of the received first video stream and/or a geographical coordinate corresponding to a pixel in the field of view (FOV) of the received first video stream.

An exemplary system embodiment may include: a first aircraft, the first aircraft including a first processor and configured to transmit a first video stream and a potential targeting coordinate related to the first video stream; a second aircraft, the second aircraft comprising a second processor and configured to transmit a second video stream; a first ground control system (GCS), the first GCS comprising a third processor, and wherein the first GCS is configured to guide the first aircraft; and a second ground control system (GCS), the second GCS comprising a fourth processor, and wherein the second GCS may: receive the first video stream, the potential targeting coordinate related to the first video stream, and the second video stream; select the potential targeting coordinate corresponding to a target as an actual targeting coordinate; and guide the second aircraft towards the actual targeting coordinate; where positive identification of the target is maintained by the second GCS from selection of the actual targeting coordinate.

In additional exemplary system embodiments, the first GCS may receive the first video stream. In additional exemplary system embodiments, the first GCS may include a first digital data link (DDL) to guide the first aircraft and receive the first video stream. In additional exemplary system embodiments, the second GCS may include a second DDL to receive the first video stream, the potential targeting coordinate related to the first video stream, and the second video stream, and guide the second aircraft towards the actual targeting coordinate. In additional exemplary system embodiments, the selected potential targeting coordinate may be a geographical coordinate corresponding to at least one of: a center field of view (CFOV) of the first video stream, and a pixel in the field of view (FOV) of the first video stream. In additional exemplary system embodiments, the second GCS further comprises a graphical user interface (GUI) in communication with the fourth processor, and wherein the GUI is configured to display the first video stream and the second video stream. In additional exemplary system embodiments, the GUI of the second GCS may display a map having a location of the first aircraft, a location of the second aircraft, a CFOV of the first video stream of the first aircraft, and a CFOV of the second video stream of the second aircraft. In additional exemplary system embodiments, the second GCS may select a terminal homing mode on the target by the second aircraft, where the terminal homing mode may include at least one of: impacting the target by the second aircraft, impacting the target by a payload deployed by the second aircraft, and impacting the target by a marker deployed by the second aircraft; and confirm a condition of the target after impact via the received first video stream from the first aircraft.

Another exemplary method embodiment may include: receiving, by a ground control system (GCS), a first video stream from a first aircraft and a potential targeting coordinate related to the first video stream; selecting, by the GCS, the potential targeting coordinate corresponding to a target as an actual targeting coordinate; receiving, by the GCS, a second video stream from a second aircraft of a plurality of aircraft, wherein the second aircraft of the plurality of aircraft is closest to the target; guiding, by the GCS, the second aircraft of the plurality of aircraft towards the actual targeting coordinate; where positive identification of the target is maintained by the GCS from selection of the actual targeting coordinate.

Additional exemplary method embodiments may include selecting, by the GCS, a terminal homing mode on the target by the second aircraft. In additional exemplary method embodiments, the terminal homing mode may include at least one of: impacting the target by the second aircraft, impacting the target by a payload deployed by the second aircraft, and impacting the target by a marker deployed by the second aircraft. Additional exemplary method embodiments may include confirming, via the GCS, a condition of the target after impact via the received first video stream from the first aircraft. Additional exemplary method embodiments may include guiding, by the GCS, a third aircraft of the plurality of aircraft towards the actual targeting coordinate. In additional exemplary method embodiments, the plurality of aircraft loiter about a pre-set area until the actual targeting coordinate is selected. In additional exemplary method embodiments, each aircraft of the plurality of aircraft follows the guided second aircraft towards the actual targeting coordinate and is spaced apart by a set time.

BRIEF DESCRIPTION OF DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The present invention allows for a first aircraft operated by a first operator at a first Ground Control System (GCS) to capture information about a scene that may include a video stream and geographic coordinates relating to the captured video stream. The video stream from the first aircraft may be transmitted to one or more GCS as encrypted data. A second operator at a second GCS may view the transmitted video stream on a display, e.g., a graphical user interface (GUI), and select a targeting coordinate on the GUI that corresponds to a position of a target on the video stream. The position of the target may be a center field of view (CFOV) or any pixel in the field of view (FOV) of the video. The position of the target may be the geographical coordinate of any pixel in the aircraft video stream. The geographical position of any given pixel may be interpolated from the CFOV coordinate and the coordinates of the four corners of the video. A second aircraft may be launched and guided towards the selected targeting coordinate by the second operator. The first aircraft may maintain a positive identification (PID) of the target while the second aircraft is guided towards the selected targeting coordinate. The second aircraft may be used to impact the target at the selected targeting coordinate. The video stream from the first aircraft may be used to confirm that the target has been hit and confirm the extent of any damage to the target. The first aircraft may continue to loiter to look for additional targets.

Figure 1A:
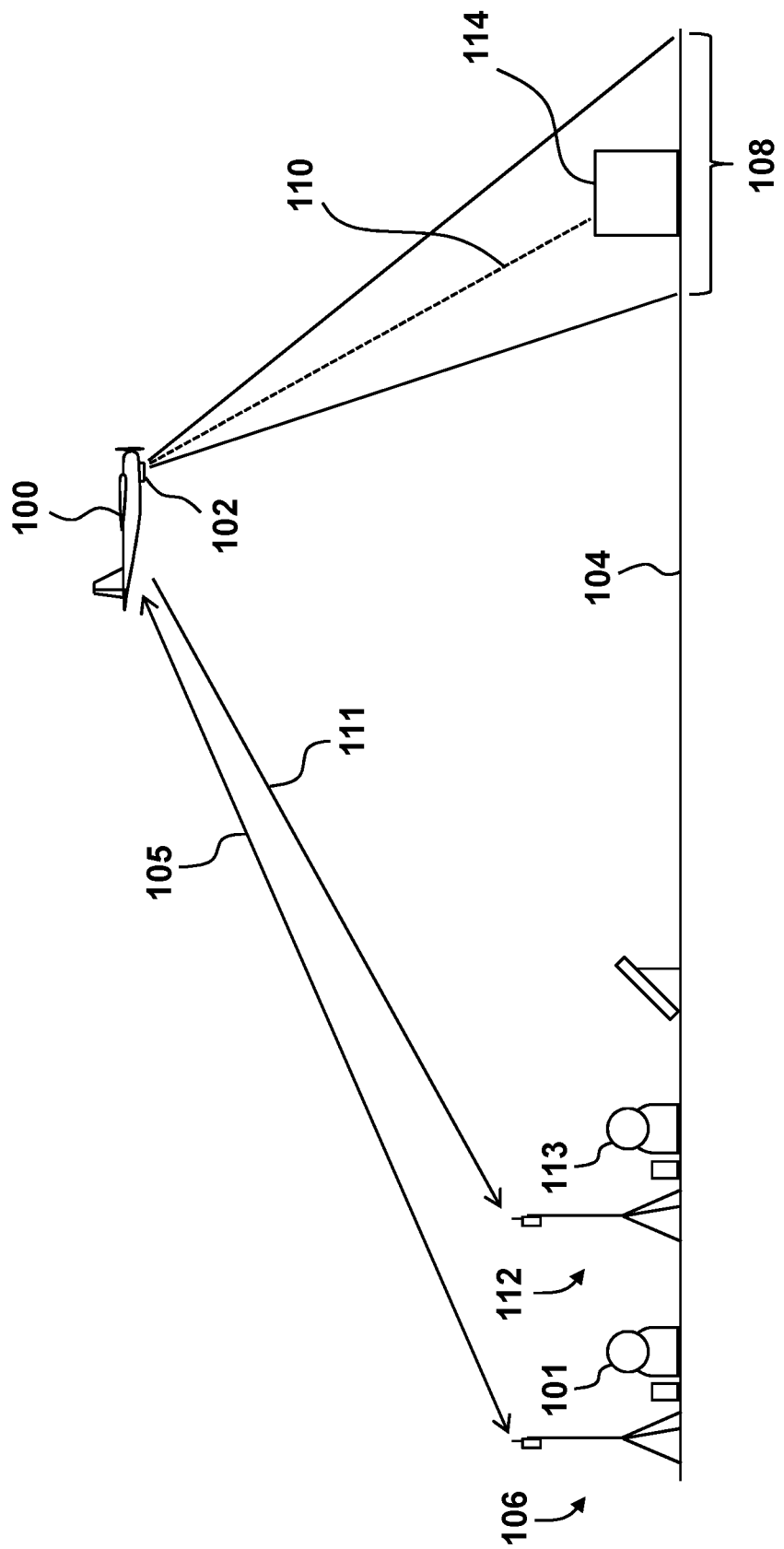
FIG. 1A depicts an embodiment of an Unmanned Aerial System (UAS) having a first aircraft transmitting information to one or more Ground Control Systems (GCS)

FIG. 1A depicts an embodiment of an Unmanned Aerial System (UAS) having a first aircraft 100 capturing information about a scene. This information may be a video stream and targeting coordinates related to that video stream. The first aircraft 100, e.g., a Puma, Raven, Wasp, or Shrike manufactured by AeroVironment, Inc. of Monrovia, CA, may have a first camera 102 having a first video sensor, which may be mounted on a gimbal to allow a first operator to direct the camera towards various locations on the ground 104. The first aircraft 100 and/or first camera 102 may be controlled by the first operator 101 at a first GCS 106 via one or more signals transmitted 105 between the first GCS 106 and the first aircraft 100. The first camera 102 may have a field of view (FOV) 108 with a center field of view (CFOV) 110 in a center of a captured video stream. The position of the first aircraft 100, first camera 102 position, and/or additional details may be used to continually calculate the geographic position of the CFOV 110 and/or the geographic position of any pixel in the FOV 108 of the first camera 102 as a potential targeting coordinate. The potential targeting coordinate may be calculated on the aircraft 100 and/or transmitted to one or more GCS (106, 112) as video stream metadata. In some embodiments, data from the aircraft 100 may be transmitted to one or more GCS (106, 112) and the one or more GCS (106, 112) may calculate the potential targeting coordinate. The video stream and potential targeting coordinates may be transmitted (105, 111) to one or more GCS, such as the first GCS 106 and a second GCS 112. A second operator 113 at the second GCS 112 may monitor the video stream transmitted 111 by the first aircraft 100 until a target 114 is identified. Once the target 114 is identified, the second operator 113 may select the potential targeting coordinate relating to that target 114 via an input at the second GCS 112, e.g., a button on a GUI having a monitor showing the video stream from the first aircraft 100. The potential targeting coordinate may be a CFOV 110 or any pixel in the FOV of the video stream. Once the potential targeting coordinate is selected, it becomes an actual targeting coordinate related to the target 114. The target 114 may be stationary or moving. If the target is moving, then a new potential targeting coordinate may be selected to become a new actual targeting coordinate that corresponds to a new location of the moving target 114, a new CFOV 110 of the first camera 102, and/or a new location of the target 114 in the FOV 108 of the camera 102. In some embodiments, the targeting coordinate may adaptively move with moving target 114 and/or the moving CFOV 110 of the first camera 102.

Figure 1B:
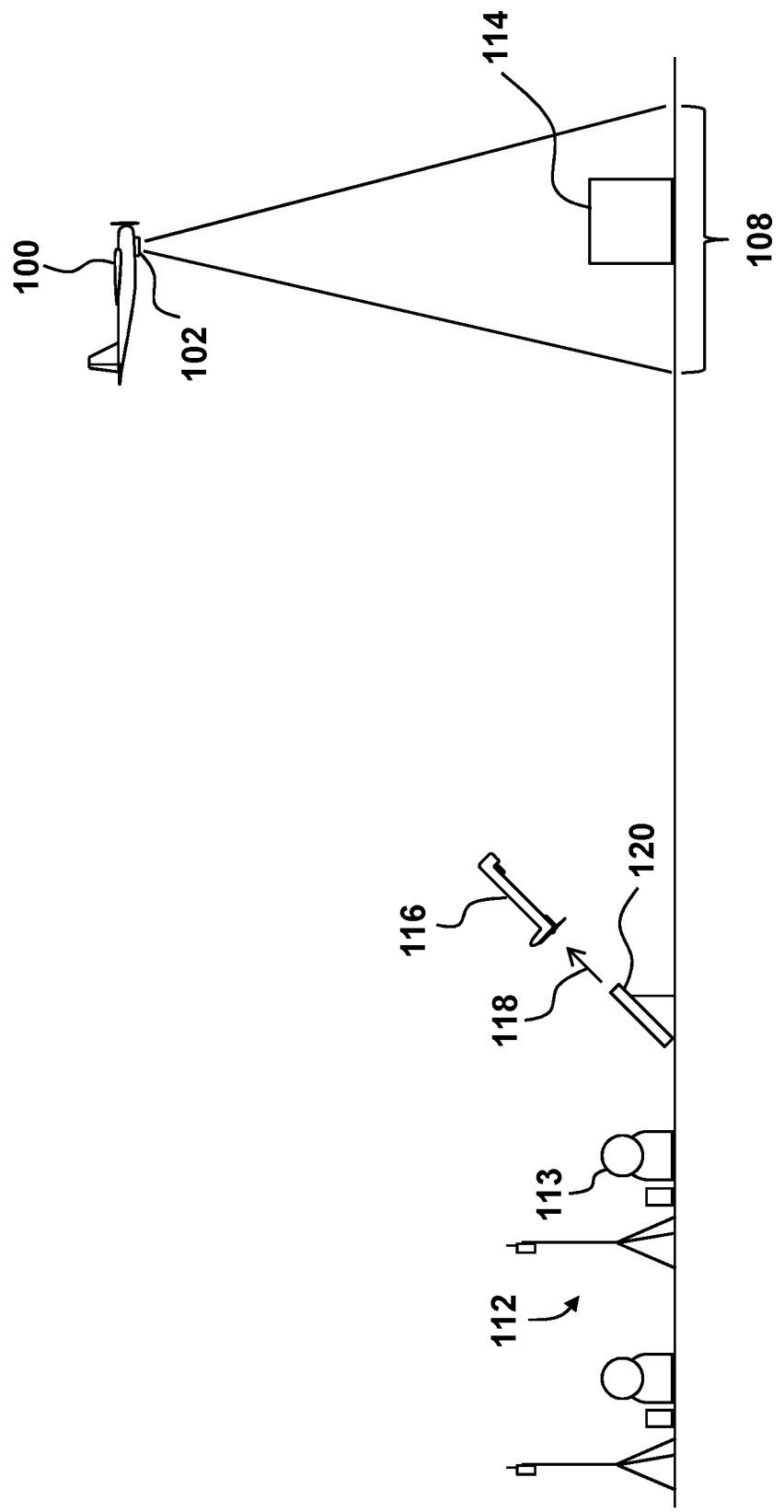
FIG. 1B depicts an embodiment of a UAS having a second aircraft launched after selection of a target identified by the first aircraft.

FIG. 1B depicts an embodiment of the UAS of FIG. 1A, where a second aircraft 116, e.g., a Switchblade® manufactured by AeroVironment, Inc. of Monrovia, CA, has been launched 118 by a launcher 120 in response to the selection of the targeting coordinate by the second operator 113 at the second GCS 112. In some embodiments, the second aircraft 116 may be launched by hand by the second operator 113 or another person. Once the actual targeting coordinate is available, the first aircraft 100 may maintain PID of the target 114, e.g., by keeping the target 114 within the FOV 108 of the first camera 102, while the second aircraft 116 is guided towards the actual targeting coordinate related to the target 114. The first aircraft 100 may be guided and/or set on autopilot to orbit, hover, and/or remain in a set region such that the FOV 108 of the first camera 102 is maintained on the target 114. In some embodiments, the second aircraft 116 may already be in-flight when the targeting coordinate is selected. In other embodiments, the second aircraft 116 may be launched from the first aircraft 100.

Figure 1C:
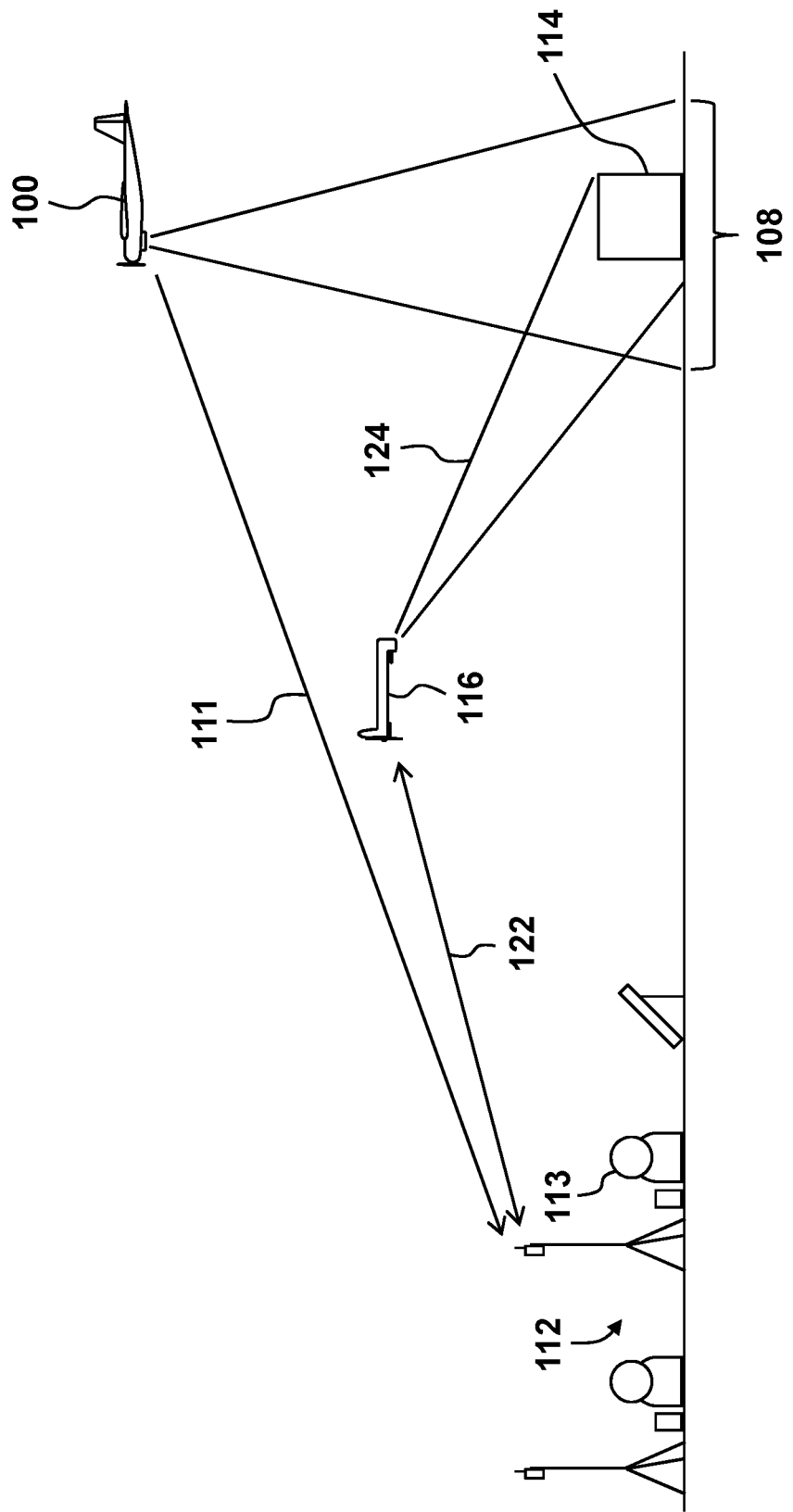
FIG. 1C depicts an embodiment of a UAS having the second aircraft view the target identified by the first aircraft, while the first aircraft maintains positive identification of the target.

FIG. 1C depicts an embodiment of the UAS of FIGS. 1A-1B, where the second aircraft 116 is flying towards the target 114 while the first aircraft 100 maintains PID of the target 114. The second operator 113 may monitor the video stream transmitted 111 by the first aircraft 100, via the second GCS 112, while the second aircraft 116 is guided towards the target 114. The second operator 113 may also monitor the video stream transmitted by the second aircraft 116, e.g., by a second camera, via one or more signals transmitted 122 between the second aircraft 116 and the second GCS 112. The second operator 113 may view the video streams transmitted by both the first aircraft 100 and the second aircraft 116 at the second GCS 112 simultaneously. When the target 114 is in the FOV (108, 124) of both cameras, a PID transfer occurs and the second operator 113 may focus on the FOV 124 of the second camera to maintain PID through completion of the mission. Once the target 114 is in the FOV 124 of the second camera of the second aircraft 116, the second operator 113 may place the second aircraft 116 into a "commit" mode.

Figure 1D:
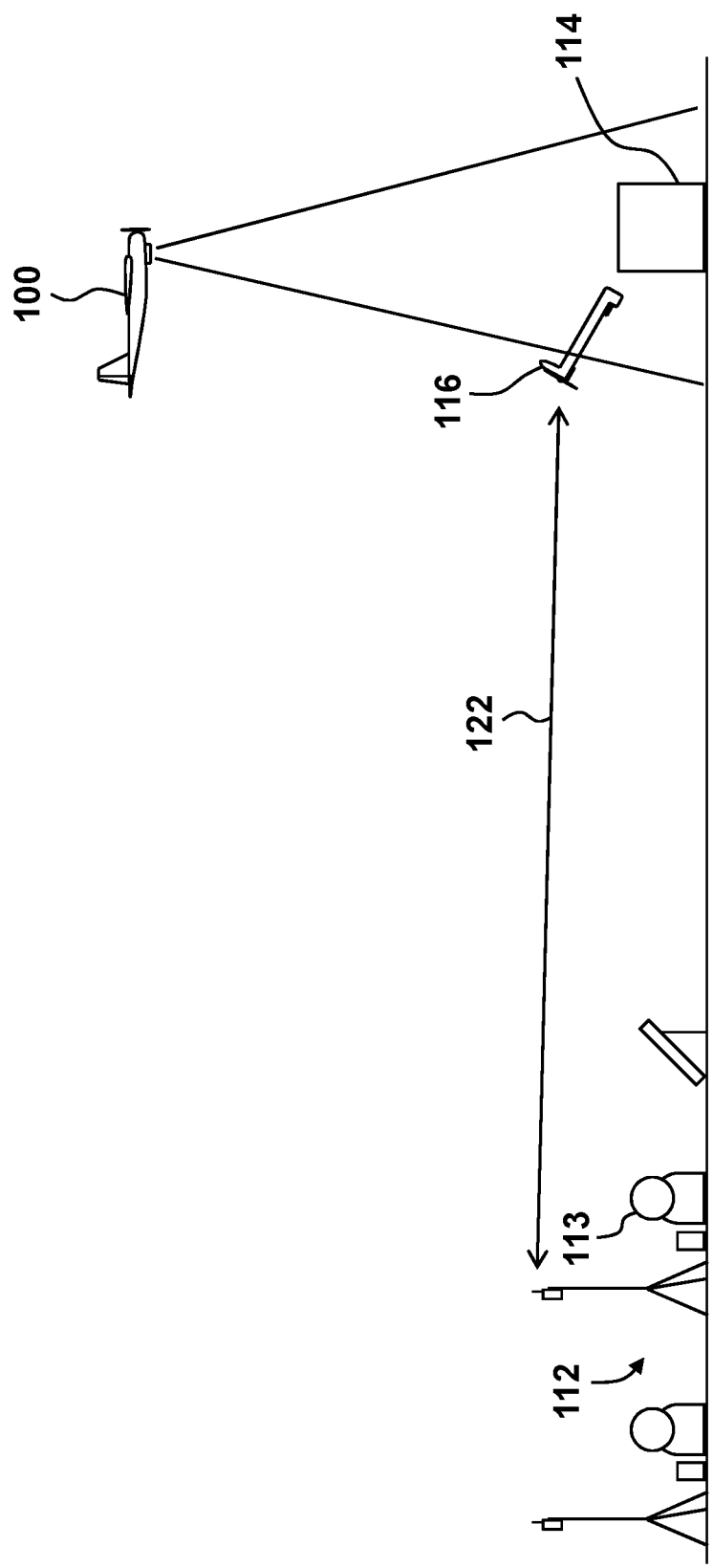
FIG. 1D depicts an embodiment of a UAS having the second aircraft enter a "commit" mode and move towards the target while the first aircraft maintains positive identification of the target.

FIG. 1D depicts an embodiment of the UAS of FIGS. 1A-1C, where the second aircraft 116 is placed into "commit" mode, via one or more signals transmitted 122 between the second aircraft 116 and the second GCS 112, in which the second aircraft 116 enters terminal homing towards the actual targeting coordinate of the target 114. In "commit" mode, the second operator 113 guides the second aircraft 116 towards the target 114. The PID of the target 114 is maintained by the first aircraft 100. In some embodiments, the second aircraft 116 may not contact the target 114, but rather deploy a payload and/or marker, e.g., paint, that may contact the target 114.

Figure 1E:
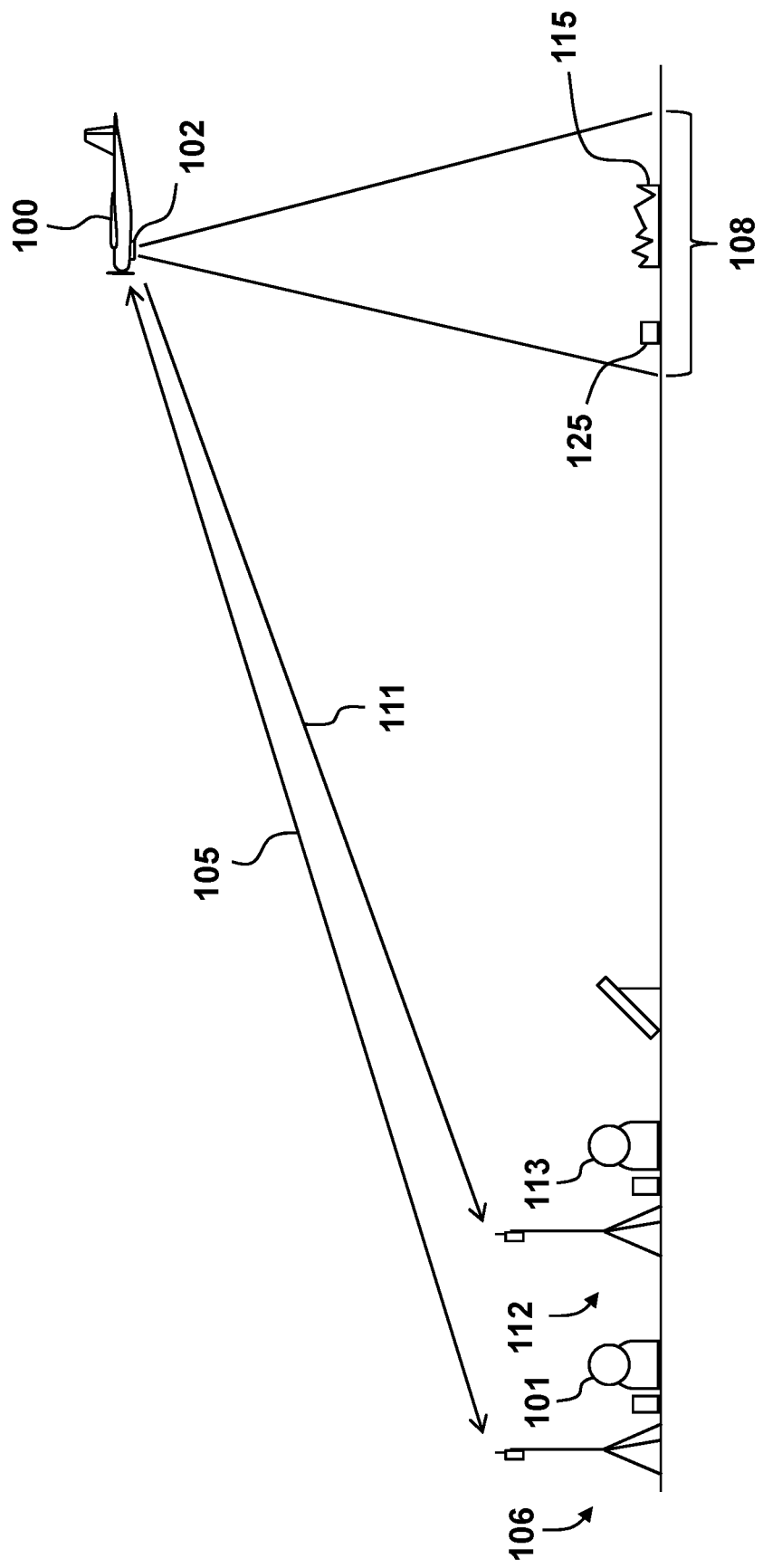
FIG. 1E depicts an embodiment of a UAS where the target was destroyed by the second aircraft and the first aircraft transmits a visual confirmation of the target hit to the one or more GCS.

FIG. 1E depicts an embodiment of the UAS of FIGS. 1A-1D, where the target 115 has been destroyed, e.g., by contact with the second aircraft carrying a payload of explosives. The first aircraft 100 maintains PID of the target 115 from first identification, via selection of the targeting coordinate (See FIG. 1A), to destruction of the target 115 and/or PID transfer. The first aircraft 100 may observe the scene in the FOV 108 of the first camera 102 and transmit (105, 111) this video stream to one or more GCS, such as the first GCS 106 and the second GCS 112. The destruction of the target 115 may be verified by the first operator 101 and/or the second operator 113 via their respective GCS (106, 112). The first aircraft 100 may then continue to transmit (105, 111) the video stream and potential targeting coordinates to the one or more GCS (106, 112) until a new target 125 is identified. The new target 125 may be within the FOV 108 of the first camera 102 of the first aircraft. The new target may also be located outside the FOV 108 of the first camera 102 of the first aircraft 100, and the first operator 101 may control the first aircraft 100 and/or the first camera 102 to locate a new target. Once the new target 125 is identified, a third plane may be launched and/or guided towards the new active targeting coordinate via the second GCS 112. The process may continue until there are no additional planes and/or all targets have been eliminated. In some embodiments, additional GCS and/or aircraft may be used to identify and/or eliminate targets. In other embodiments, a single GCS may be used to control multiple aircraft. A first aircraft may be used to identify a potential targeting coordinate and select the potential targeting coordinate as an actual targeting coordinate. The first aircraft may then maintain a FOV of the actual targeting coordinate, e.g., via automated flight circling or otherwise hovering above the target, while an operator flies a second aircraft to the actual targeting coordinate, such that PID is maintained from initial selection of the potential targeting coordinate to final impact with the target.

Figure 2:
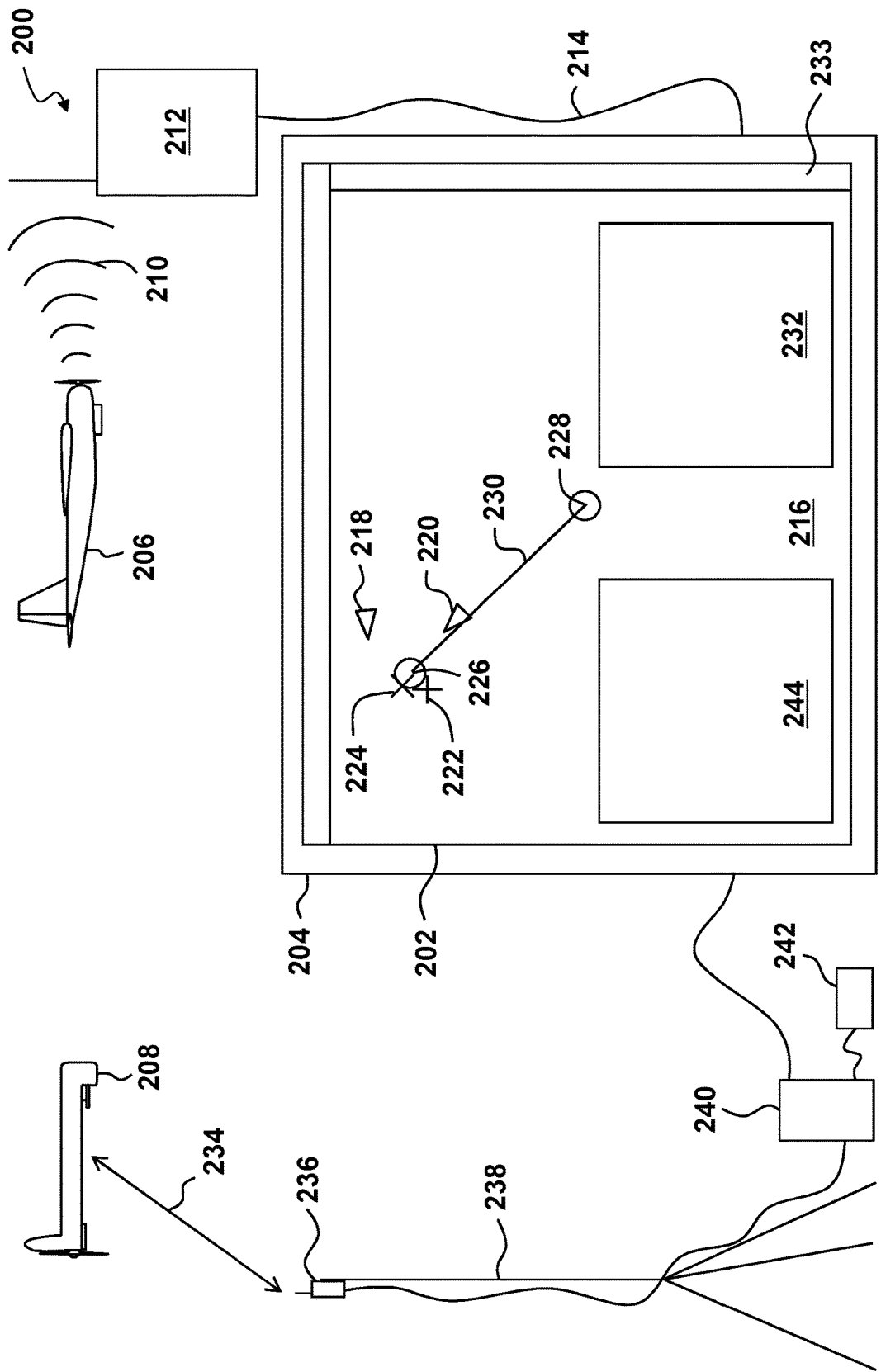
FIG. 2 depicts an exemplary GCS of an embodiment having a user interface for viewing transmitted information and/or video, and selecting a targeting coordinate based on received information and/or video.

FIG. 2 depicts an exemplary GCS embodiment 200 having a GUI 202 on a computing device 204, e.g., a laptop or tablet computer having a processor and addressable memory (See FIG. 7), for viewing information transmitted by one or more aircraft, e.g., a first aircraft 206 and a second aircraft 208, and selecting a target coordinate based on received transmitted information. The first aircraft 206 may be controlled by a first GCS (See FIG. 1A, 106), and the first aircraft may transmit 210 information about a scene, e.g., a video stream and geographic coordinates relating to the captured video stream. The transmitted 210 information from the first aircraft 206 may be received by a first digital data link (DDL) 212, e.g., a pocket DDL. The first DDL 212 may be connected 214 to the computing device 204, e.g., by a USB and/or Ethernet cable.

The computing device 204 may have a display such as a GUI 202, which may display a map 216 showing the location 218 of the first aircraft 206; the location 220 of the second aircraft; the CFOV 222 of the first aircraft 206, displayed as a "+"; the CFOV of the second aircraft 224, displayed as a "x"; the actual targeting coordinate 226; an entry point 228 of the second aircraft 208; and a direction 230 of the second aircraft from the entry point 228 to the actual targeting coordinate 226. In some embodiments, the map 216 may also display the FOV of each aircraft. In the event that there is wind significant to the second aircraft terminal phase operation, e.g., greater than five knots, the second aircraft may select an entry point 228 which may be an operator selectable minimum distance, e.g., 1,000 meters downwind from the target, from the actual targeting coordinate 226 and downwind. In some embodiments, this entry point may be chosen automatically by the computing device 204 without the need for additional operator input. Approaching the actual targeting coordinate 226 from this entry point 228 may increase the accuracy and/or maneuverability of the second aircraft 208 with respect to the actual targeting coordinate 226.

The GUI 202 may also display a first video stream 232 from video transmitted 210 by the first aircraft 206. An operator may view this first video stream 232 until a desired target appears in the first video stream 232. The operator may then select, e.g., via one or more options on a toolbar 233, e.g., a FalconView toolbar (FVTB) by AeroVironment, Inc. of Monrovia, CA, via a user interface, and/or via a touch interface, to use a CFOV and/or any pixel in the FOV of the first video stream 232 as a targeting coordinate. In some embodiments, the operator may select any portion of the video stream to be a targeting coordinate. When the operator selects the potential targeting coordinate it becomes an actual targeting coordinate 226. The information transmitted 210 by the first aircraft 206 and received by the first DDL 212 includes geographic information related to the CFOV and/or any pixel in the FOV of the first video stream 232 being viewed by the operator. Once the actual targeting coordinate 226 is active, the operator may launch (See FIG. 1B, 118) a second aircraft 208 and/or take control of a second aircraft 208 that is already in-flight. One or more signals transmitted 234 between a second DDL 236 and the second aircraft 208 may be used to control the second aircraft 208 and receive a video stream from the second aircraft 208. The second DDL 236 may be mounted on a tower 238 to ensure line-of-sight with the second aircraft 208. The second DDL 236 may be connected to a hub 240 which may be connected to the computing device 204 and/or a second aircraft controller 242.

The GUI may display a second video stream 244 from video transmitted 234 by the second aircraft 208. Once the actual targeting coordinate 226 is active and the second aircraft 208 is in-flight, the operator may view the video streams (232, 244) of both the first aircraft 206 and the second aircraft 208. By using both video streams (232, 244), the operator guiding the second aircraft 208 towards the actual targeting coordinate 226 may use the second aircraft controller 242 to maintain PID of the target from initial selection of the potential targeting coordinate to final impact with the target. In some embodiments, the video streams (232, 244) may be presented proximate to one another on a single screen and device and/or a plurality of screens and/or devices.

Figure 3:
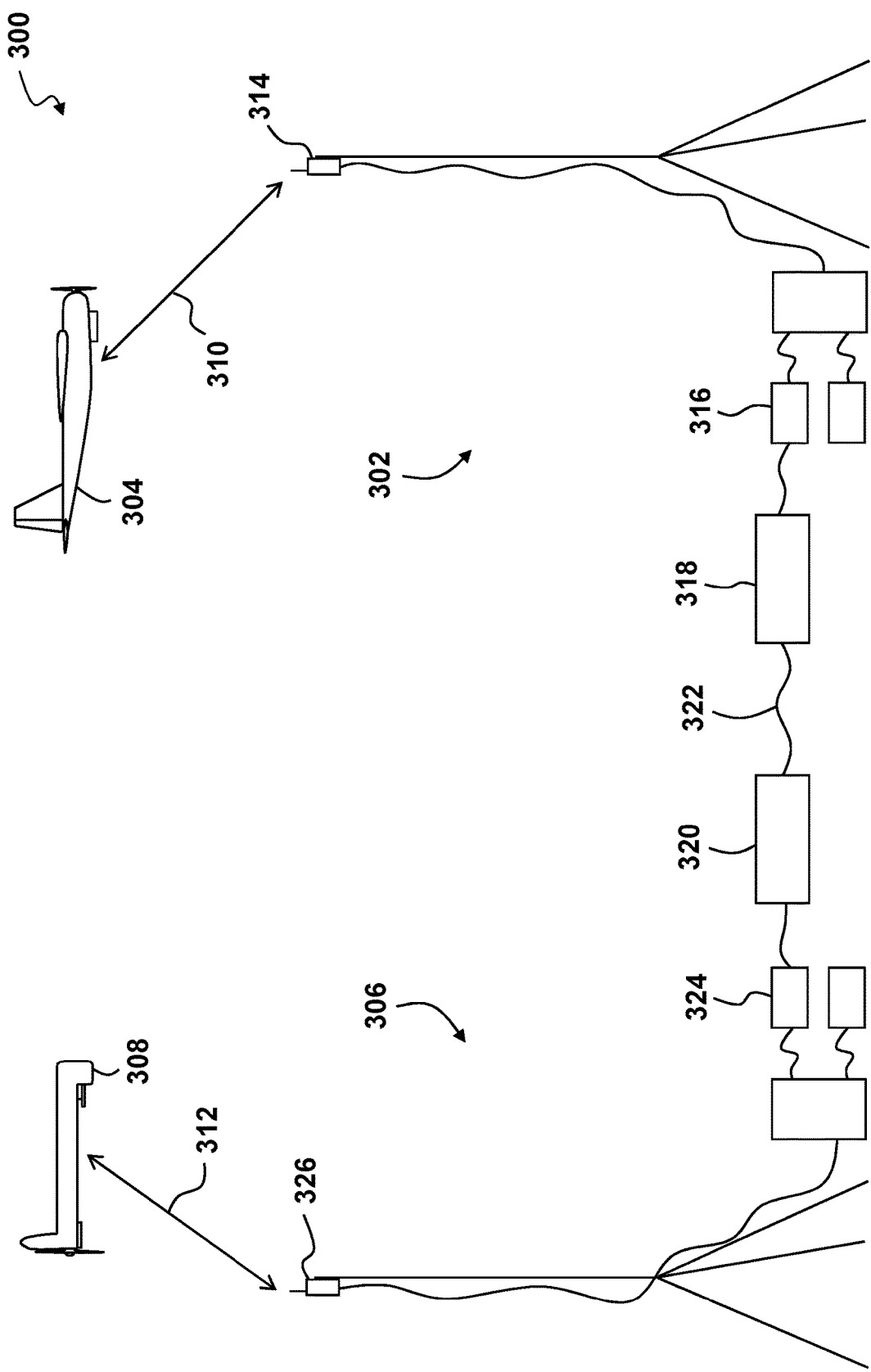
FIG. 3 depicts an exemplary connection between a first GCS controlling a first aircraft and a second GCS controlling a second aircraft.

FIG. 3 depicts an exemplary GCS embodiment 300 between a first GCS 302 controlling a first aircraft 304 and a second GCS 306 controlling a second aircraft 308. In some embodiments, a plurality of GCS may be spaced apart geographically such that a direct connection between them, e.g., via Ethernet and/or USB cables, is not feasible (See FIG. 2) Utilizing multiple GCS may be useful in reducing the time from identification of a target to final impact with that target. In other embodiments, multiple GCS (302, 306) may be spaced close enough geographically that they may be directly connected, and information transmitted (310, 312) by the first aircraft 304 and/or the second aircraft 308 may be shared without the need for an additional DDL, such as a pocket DDL (See FIG. 2, 212). In some embodiments, a single DDL may be used to receive and/or transmit data, e.g., a video stream, potential targeting coordinates related to the video stream, and/or one or more aircraft controls, between two or more aircraft.

Information, e.g., a video stream and geographic coordinates relating to the captured video stream, may be transmitted 310 by the first aircraft to a first DDL 314 of a first GCS 302. The first DDL 314 may transmit the received information to a first computing device 316, e.g., a laptop or tablet computer. The first computing device 316 may be connected to a first adapter box 318 by a cable, e.g., a USB cable. The first adapter box 318 may be connected to a second adapter box 320 by an Ethernet cable 322, e.g., an Ethernet cable up to 100 meters in length. The second adapter box 320 may be connected to a second computing device 324 by a cable, e.g., a USB cable. The adapter boxes (318, 320) may be used to convert USB to Ethernet and vice-versa. An operator at the second computing device 324 may view the video stream captured by the first aircraft 304 and select a potential targeting coordinate based on that video stream (See FIG. 2). The operator at the second computing device 324 may also receive the video stream from the second aircraft 308, which is transmitted 312 to a second DDL 326 of the second GCS 306, and then to the second computing device 324.

Figure 4A:
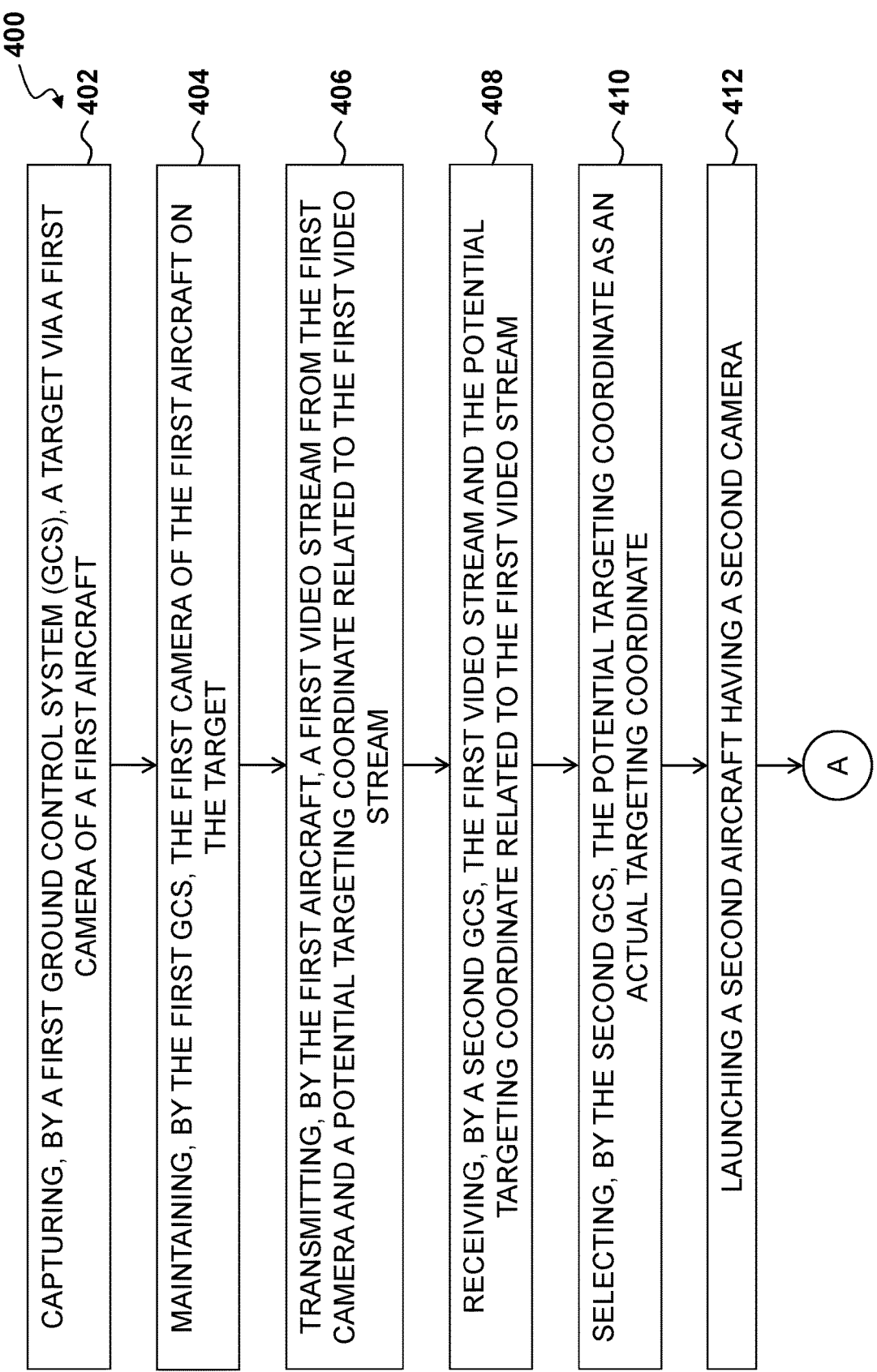
FIGS. 4A-4C depict an exemplary functional block diagram of a method embodiment for identifying, eliminating, and confirming a hit on a target with two or more aircraft while maintaining a positive identification of the target.
Figure 4B:
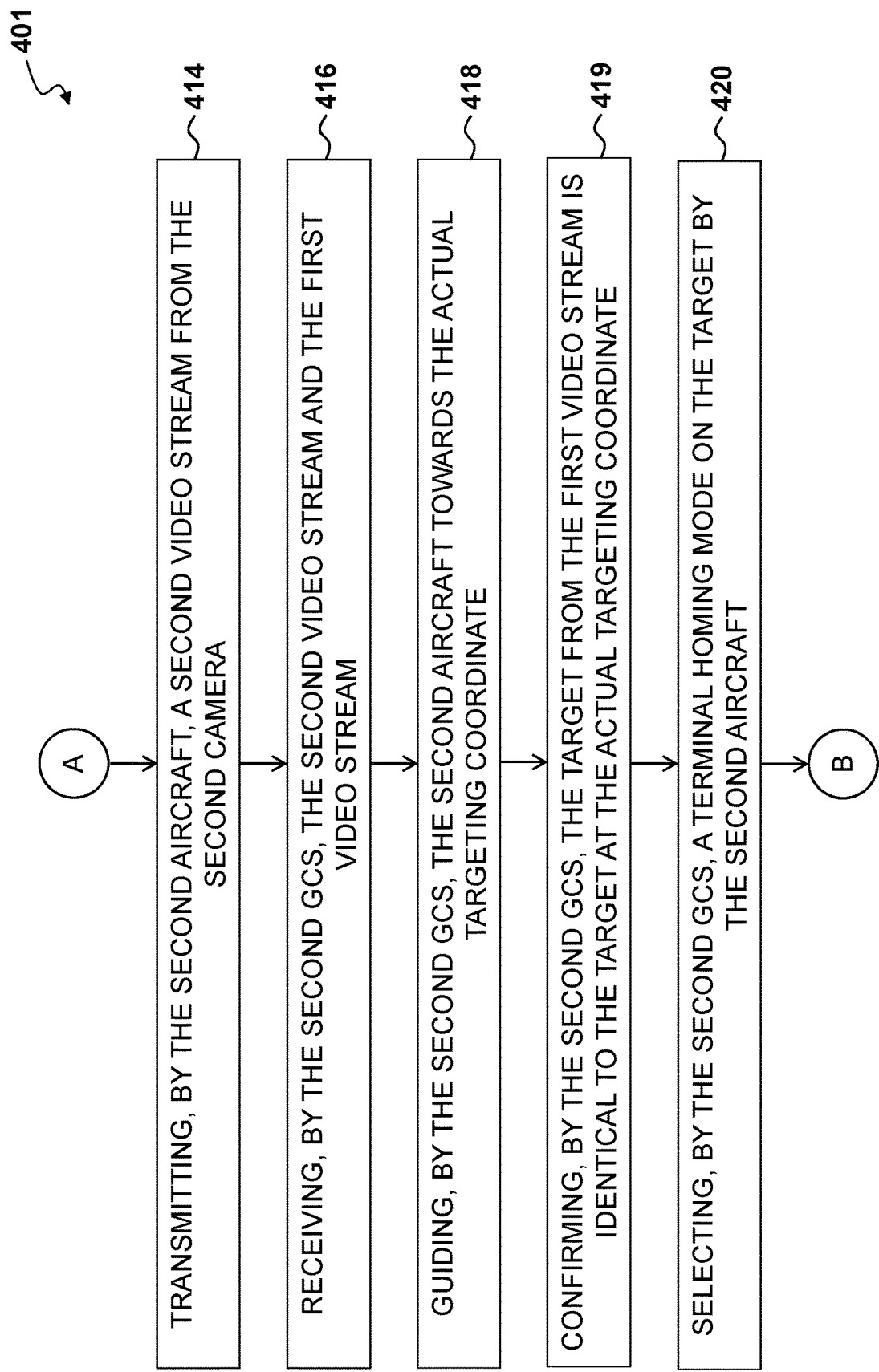
Figure 4C:
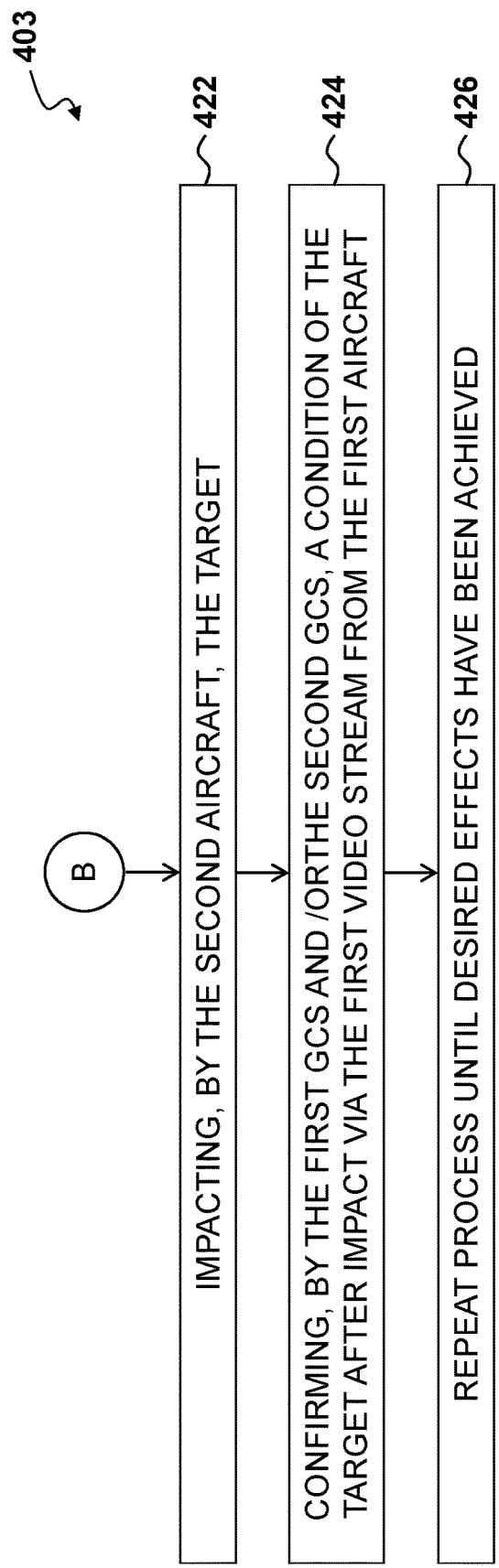

FIGS. 4A-4C depict an exemplary functional block diagram of a method embodiment for identifying, eliminating, and confirming any damage to a target with two aircraft while maintaining a positive identification of the target from initial identification through final confirmation (400, 401, 403). Reference characters A and B are used to show the connection between the steps in FIG. 4A-4C. A first operator of a first aircraft, via a first ground control system (GCS) captures a video of a potential target via a first camera disposed on the first aircraft (step 402). The operator maintains, via the first GCS, the first camera of the first aircraft on the target to maintain PID (step 404). The first aircraft transmits a video stream from the first camera and a potential targeting coordinate related to the first video stream (step 406). The potential targeting coordinate may be embedded in the video stream as metadata, and may be continuously updated as the CFOV changes across a scene. A second operator, via a second GCS, receives the first video stream and the potential targeting coordinate related to the first video stream from the first aircraft (step 408). The second operator selects, via the second GCS, the potential targeting coordinate as an actual targeting coordinate (step 410). In some embodiments, the second operator may select a new actual targeting coordinate if the second operator identifies a new target, e.g., a target of higher importance than the originally selected target. A second aircraft having a second camera is launched (step 412). The second operator may launch the second aircraft, or another individual may perform a pre-launch checklist and launch the second aircraft. In some embodiments, the second aircraft may already be in-flight and the second operator may switch to and/or continue to control the second aircraft. The second aircraft may be launched via the first GCS and/or the second GCS. The second aircraft transmits a second video stream from the second camera (step 414). The second operator, via the second GCS, receives the second video stream and the first video stream (step 416). The second operator, via the second GCS, guides the second aircraft towards the actual targeting coordinate (step 418). The second operator, via the second GCS, confirms that the target identified in the first video stream is the same as the target located at the actual targeting coordinate (step 419). The second operator, via the second GCS, selects a terminal homing mode on the target by the second aircraft (step 420). In some embodiments, the target may be mobile and may have changed position from its initial targeting coordinate. If the target has moved, the second operator may adjust, via the second GCS, the path of the second aircraft to enter terminal homing mode to the new target location. In some embodiments, the second operator may select, via the second GCS, a new targeting coordinate from the first video stream based on the new target location as long as PID has been maintained by the first video stream. The second aircraft impacts the target (step 422). In some embodiments, the second aircraft may deploy a payload on the target, e.g., explosives, or a marker, e.g., paint. The first operator and/or the second operator confirms, via the first GCS and/or the second GCS, the condition of the target after impact via the first video stream from the first aircraft (step 424). In some embodiments, the second operator may also confirm, via the second GCS, the condition of the target after impact via the first video stream from the first aircraft. The second operator may, via the second GCS, then decide if further action is needed, e.g., selecting a new targeting coordinate and/or launching a third aircraft. In some embodiments, this process may be repeated until desired effects have been achieved, e.g., the target is eliminated (step 426).

Figure 5:
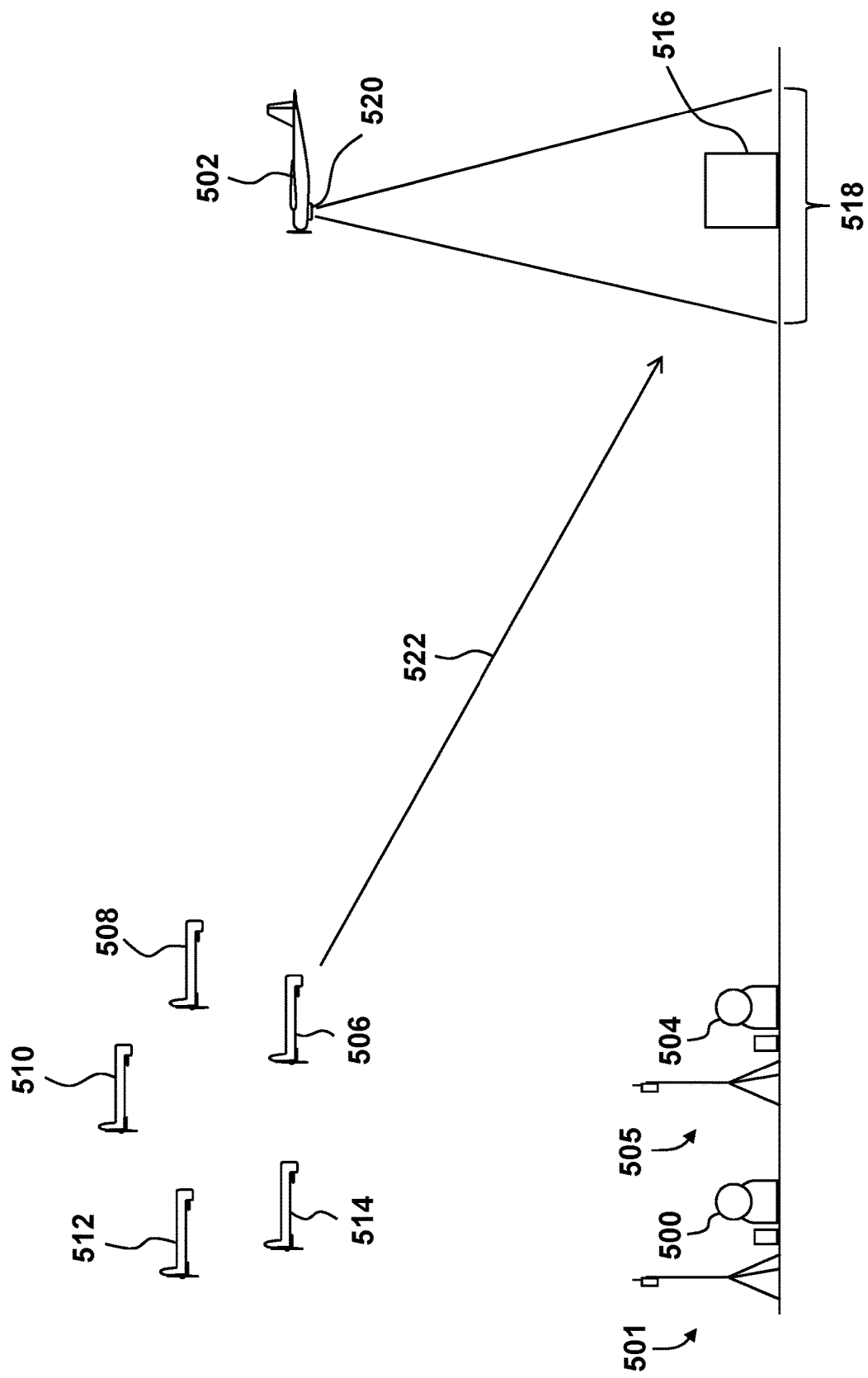
FIG. 5 depicts an embodiment of a UAS having multiple aircraft loitering until a target is identified and an actual targeting coordinate relating to the target is selected.

FIG. 5 depicts an embodiment of a UAS having a first operator 500 controlling a first aircraft 502, via a first GCS 501, and a second operator 504 that may control one of a plurality of aircraft (506, 508, 510, 512, 514) in-flight, via a second GCS 505. The plurality of aircraft (506, 508, 510, 512, 514) may loiter about a pre-set area and/or pattern until needed by the second operator 504. The first operator 502 may, via the first GCS 501, identify a target 516 within the FOV 518 of a camera 520 on the first aircraft 502. The second operator 504 may, via the second GCS 505, view the target 516 via a video stream transmitted by the first aircraft 502 to the second GCS 505. The second operator 504 may, via the second GCS 505, select a potential targeting coordinate relating to the target 516 as an active targeting coordinate (See FIG. 2). The second operator 504 may, via the second GCS 505, select a second aircraft 506, of the plurality of aircraft (506, 508, 510, 512, 514) that are loitering, to be guided 522 towards the target 516. The second operator 504, via the second GCS 505, maintains PID of the target 516 during the selection of the second aircraft 506 via the video stream transmitted by the first aircraft 502 to the second GCS 505. The remaining plurality of aircraft (508, 510, 512, 514) remain loitering until needed by the second operator 504 to be guided towards the target 516 and/or a new target.

Figure 6:
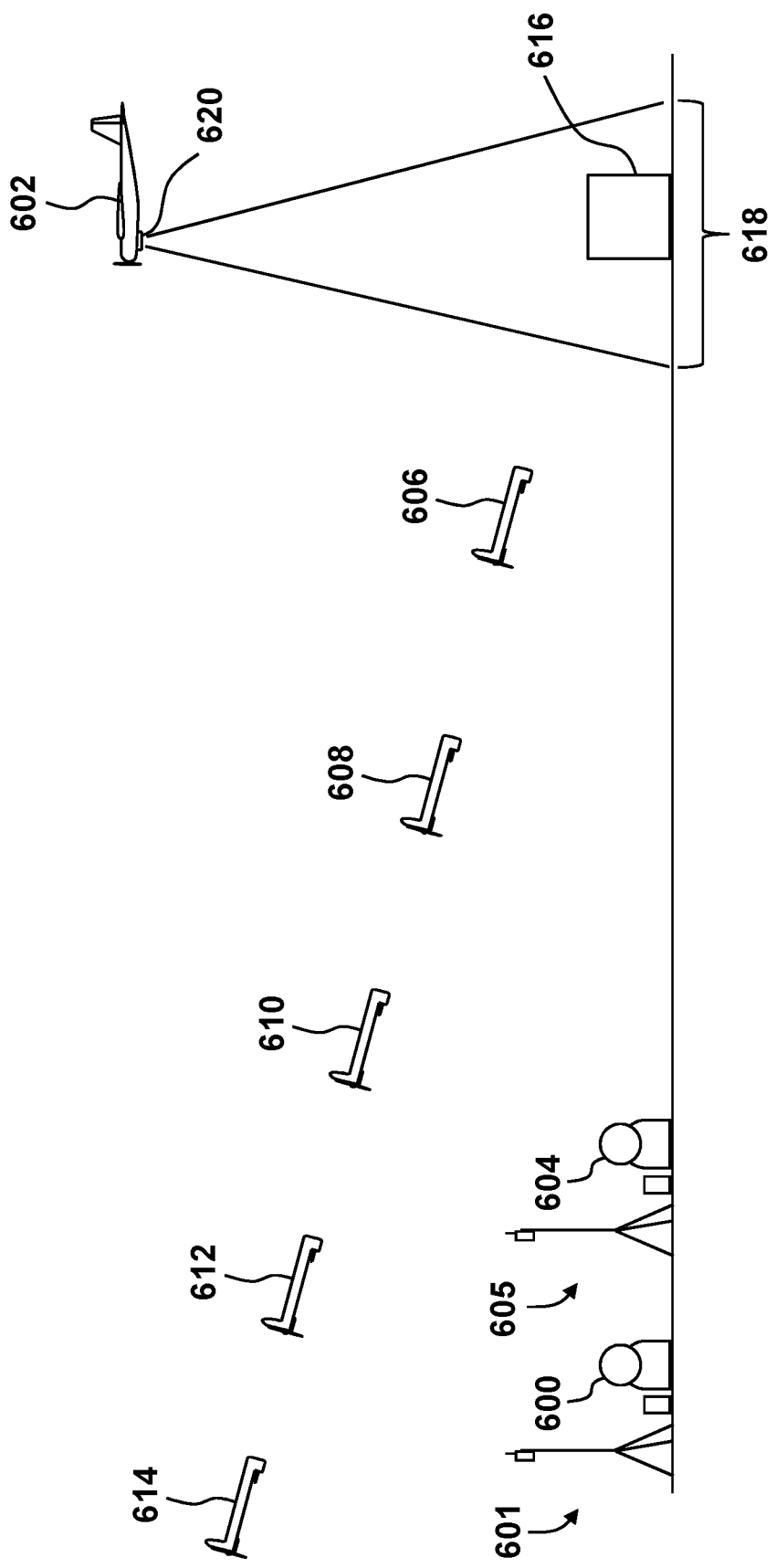
FIG. 6 depicts an embodiment of a UAS having multiple aircraft guided to a single target, where each of the aircraft guided to the single target are automatically spaced apart to allow for a single operator to switch to control subsequent aircraft upon impact.

FIG. 6 depicts an embodiment of a UAS having a first operator 600 controlling a first aircraft 602, via a first GCS 601, and a second operator 604 controlling a plurality of aircraft (606, 608, 610, 612, 614), via a second GCS 605, that are each spaced apart by a set time and being guided towards a target 616. The first operator 600 may identify, via the first GCS 601, a target 616 in the FOV 618 of a first camera 620 on the first aircraft 602. The second operator 604 may, via the second GCS 605, select an active targeting coordinate based on the target 616 (See FIG. 2). Once an active targeting coordinate is selected by the second operator 604, the plurality of aircraft (606, 608, 610, 612, 614) may line up to follow and be guided to the target 616, such that each of the plurality of aircraft (606, 608, 610, 612, 614) is spaced apart by a set time. The second operator 604 may view, via the second GCS 605, a video feed from both the first aircraft 602 and the aircraft 606 closest to the target 616 to maintain PID of the target 616. The second operator 604 may also take control of the aircraft 606 closest to the target 616, while the remaining aircraft (608, 610, 612, 614) may continue on autopilot. Once the aircraft 606 contacts the target, the second operator 604 may continue to view, via the second GCS 605, a video feed from the first aircraft 602. The second operator 604 may then take control of the aircraft 608, via the second GCS 605, which is now the closest aircraft to the target 616, and view the video feed from a third aircraft 608. Switching control and/or viewing video feeds from subsequent aircraft (608, 610, 612, 614) may be automatically controlled by a computing device of the second GCS 605 as each aircraft (606, 608, 610, 612, 614) contacts the target (See FIGS. 2 and 7). This process may continue until the target 616 is eliminated and/or there are no remaining aircraft for the second operator 604 to control.

Figure 7:
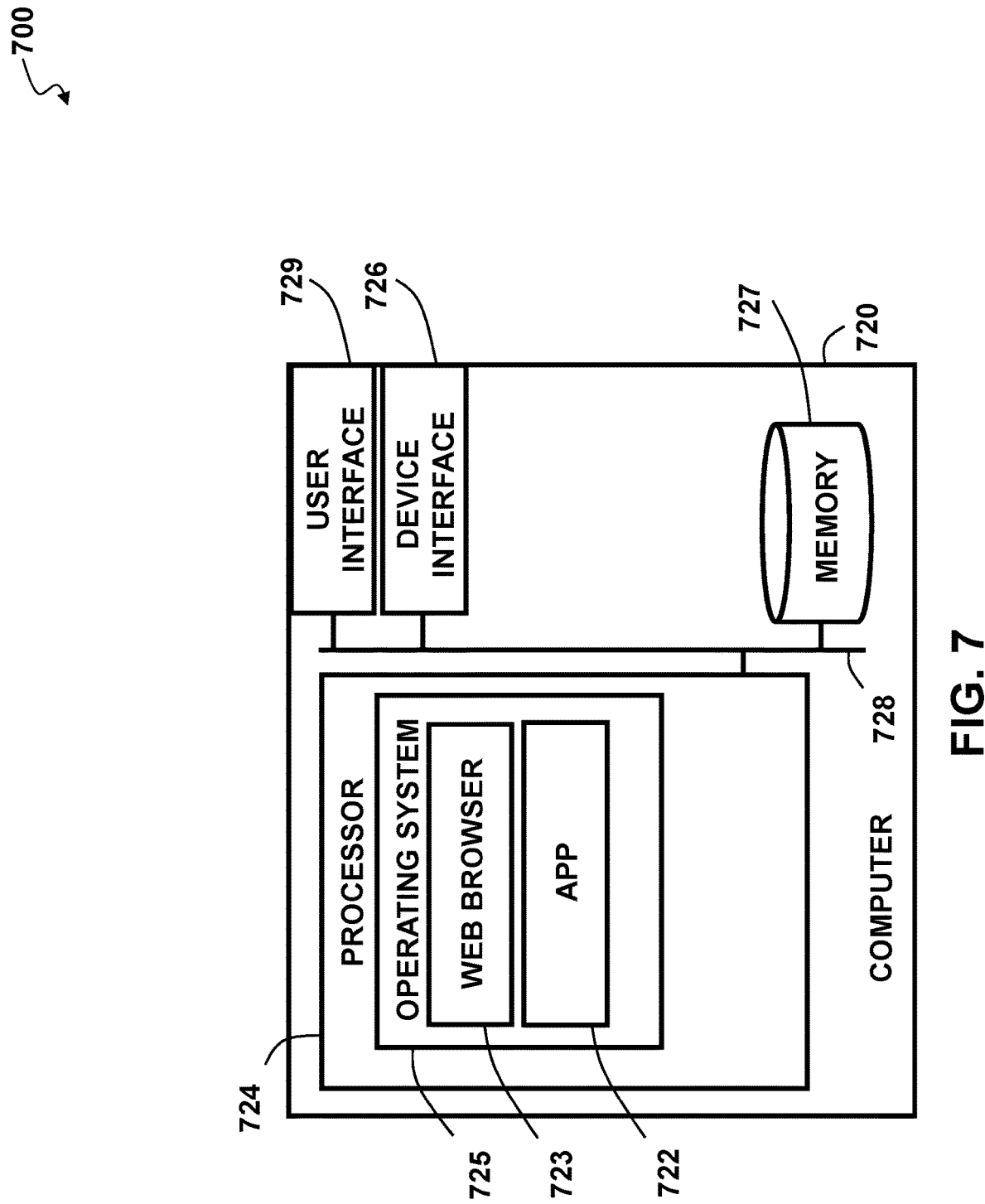
FIG. 7 illustrates an exemplary top level functional block diagram of a computing device embodiment of a GCS and/or one or more UAS.

FIG. 7 illustrates an exemplary top level functional block diagram of a computing device embodiment of a GCS and/or one or more UAS 700. The exemplary embodiment 700 is shown as a computing device 720 having a processor 724, such as a central processing unit (CPU), addressable memory 727, an external device interface 726, e.g., an optional universal serial bus port and related processing, and/or an Ethernet port and related processing, and an optional user interface 729 (See FIG. 2), e.g., an array of status lights and one or more toggle switches, and/or a display, and/or a keyboard and/or a pointer-mouse system and/or a touch screen. Optionally, the addressable memory 727 may for example be: flash memory, eprom, and/or a disk drive or other hard drive. These elements may be in communication with one another via a data bus 728. The processor 724 may have an operating system 725 such as one supporting a web browser 723 and/or applications 722, which may be configured to execute steps of a process according to the exemplary embodiments described herein.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A targeting method, comprising:
capturing a first video of a scene about a targeting coordinate by a first video sensor on a first aircraft;
capturing a second video of the scene by a second video sensor on a second aircraft;
displaying the second video proximate to the first video as the second aircraft approaches the targeting coordinate;
wherein a positive identification is executed based on a target being identified in both the first video and the second video simultaneously; and
controlling the second aircraft to impact the target while maintaining the positive identification.

2. The method of claim 1, wherein the targeting coordinate is a geographical coordinate corresponding to a pixel in a field of view (FOV) of the captured first video.

3. The method of claim 1, further comprising:
transmitting the first video and associated targeting coordinate; and
receiving the first video on a first display in communication with a second processor, the second processor also receiving the targeting coordinate.

4. The method claim 1, further comprising:
launching the second aircraft, the second aircraft having the second video sensor; and
guiding the first aircraft about the targeting coordinate to maintain a field of view (FOV) of the first video sensor about the targeting coordinate.

5. The method of claim 1, further comprising:
setting an entry point, to the targeting coordinate, for the second aircraft based on a predetermined distance from the target and wind speed.

6. The method of claim 1, wherein a positive identification transfer comprises:
comparing the received first video of the scene and the received second video of the scene on a first display to confirm the second aircraft is approaching the targeting coordinate.

7. The method of claim 1, further comprising:
selecting a terminal homing mode on the target by the second aircraft in response to viewing the first video and the second video on a first display, wherein the terminal homing mode further comprises at least one of: impacting the target by the second aircraft, impacting the target by a payload deployed by the second aircraft, and impacting the target by a marker deployed by the second aircraft.

8. The method of claim 7, further comprising:
confirming a condition of the target after impact in response to viewing the first video on the first display.

9. The method of claim 7, further comprising:
capturing a new first video of a new scene about a new targeting coordinate by the first video sensor on the first aircraft;
transmitting the new first video and associated new targeting coordinate by the first aircraft;
receiving the new first video on the first display, and receiving the new targeting coordinate;
selecting the new targeting coordinate for a third aircraft in response to viewing the new first video on the first display; and
guiding the third aircraft toward the new targeting coordinate;
wherein positive identification of a new target corresponding to the new targeting coordinate is maintained from selection of the new targeting coordinate; and
wherein the selected new targeting coordinate is a geographical coordinate corresponding to a center field of view (CFOV) of the captured new first video.

10. A method, comprising:
receiving, by a ground control system (GCS), a first video stream from a first aircraft and a targeting coordinate related to the first video stream, the first aircraft configured to transmit the first video stream; and
receiving, by the GCS, a second video stream from a second aircraft, the second aircraft configured to transmit the second video stream;
wherein a positive identification is executed, by the GCS, based on a target being identified in both a field of view (FOV) of the received first video stream and a FOV of the received second video stream simultaneously; and
controlling, by the GCS, the second aircraft to impact the target while maintaining the positive identification.

11. The method of claim 10, wherein the selected targeting coordinate is a geographical coordinate corresponding to a pixel in the field of view (FOV) of the received first video stream.

12. The method of claim 10, further comprising:
selecting, by the GCS, a terminal homing mode on the target by the second aircraft.

13. The method of claim 12, wherein the terminal homing mode comprises at least one of: impacting the target by the second aircraft, impacting the target by a payload deployed by the second aircraft, and impacting the target by a marker deployed by the second aircraft.

14. The method of claim 13, further comprising:
confirming, via the GCS, a condition of the target after impact via the received first video stream from the first aircraft;
selecting, by the GCS, a new targeting coordinate corresponding to a new target;
receiving, by the GCS, a third video stream from a third aircraft, the third aircraft configured to transmit the third video stream; and guiding, by the GCS, the third aircraft towards the new targeting coordinate;

wherein positive identification of the new target corresponding to the new targeting coordinate is maintained from selection of the new actual targeting coordinate.

15. The method of claim 10, wherein the selected targeting coordinate is a geographical coordinate corresponding to a center field of view (CFOV) of the received first video stream.

16. A system comprising:
a first aircraft, the first aircraft configured to transmit a first video stream and a targeting coordinate related to the first video stream;
a second aircraft, the second aircraft configured to transmit a second video stream;
a ground control system (GCS), the GCS configured to:
receive the first video stream and the targeting coordinate related to the first video stream; and
receive the second video stream;
wherein a positive identification is executed based on a target being identified in both the first video stream and the second video stream simultaneously; and
control the second aircraft to impact the target while maintaining the positive identification.

17. The system of claim 16, wherein the GCS further comprises a first digital data link (DDL) to guide the first aircraft and receive the first video stream.

18. The system of claim 16, wherein the selected targeting coordinate is a geographical coordinate corresponding to a center field of view (CFOV) of the first video stream.

19. The system of claim 16, wherein the GCS is further configured to:
select a terminal homing mode on the target by the second aircraft.

20. The method of claim 19, wherein the terminal homing mode comprises at least one of: impacting the target by the second aircraft, impacting the target by a payload deployed by the second aircraft, and impacting the target by a marker deployed by the second aircraft.

* * * * *